Sept. 30, 1969 J. E. BOUET 3,469,382
TILT-CONTROL OF A TRACTOR-MOUNTED MOWER
Filed July 9, 1968 3 Sheets-Sheet 1

Inventor:
Jacques E. Bouet

By John J. Kowalik
Atty.

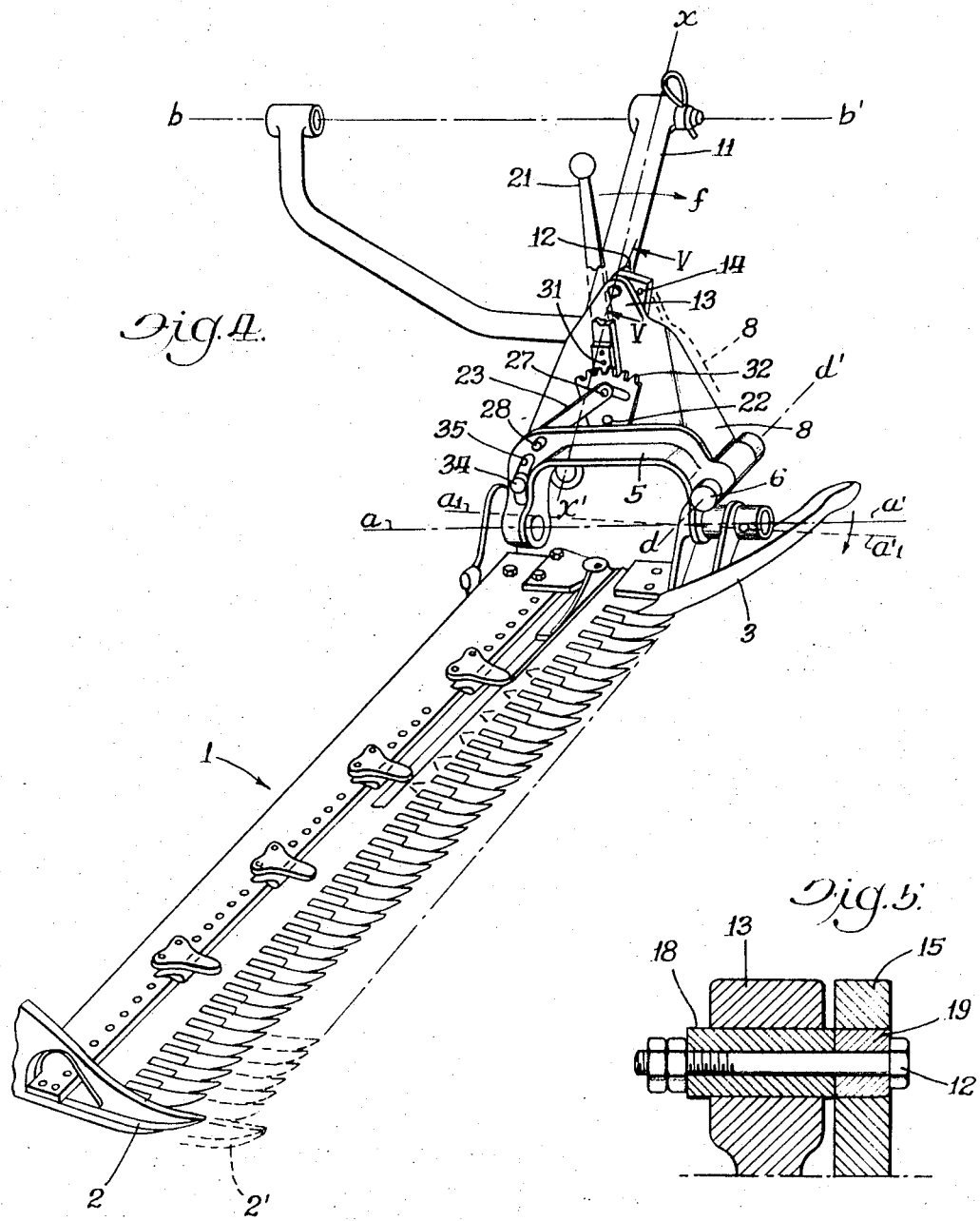
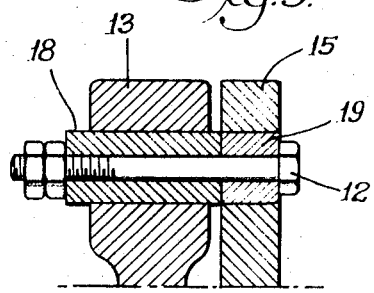

Sept. 30, 1969   J. E. BOUET   3,469,382
TILT-CONTROL OF A TRACTOR-MOUNTED MOWER
Filed July 9, 1968   3 Sheets-Sheet 3
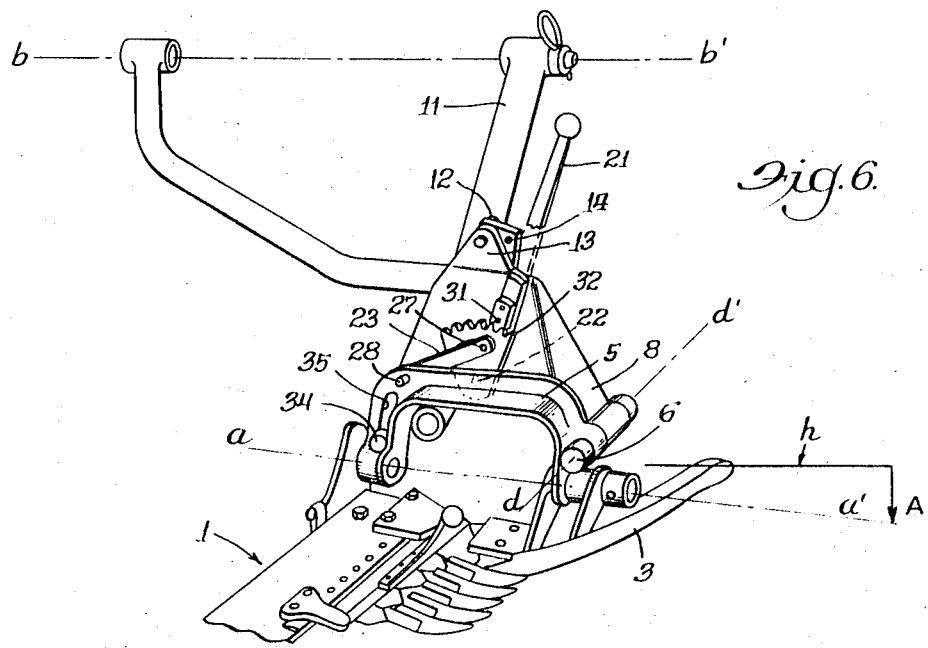
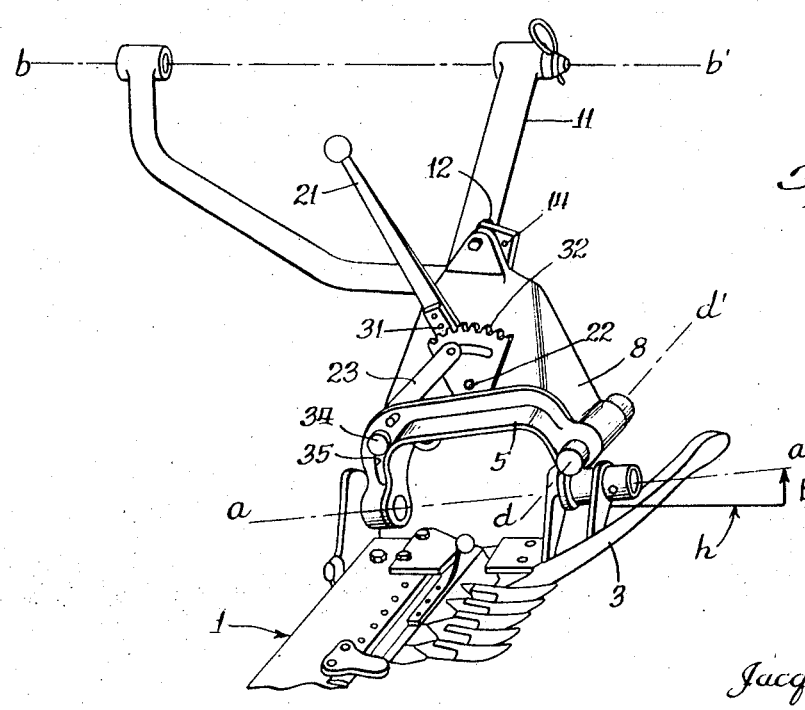
Inventor:
Jacques E. Bouet
By John J. Kowarik
Atty.

3,469,382
TILT-CONTROL OF A TRACTOR-MOUNTED
MOWER
Jacques E. Bouet, Rambouillet, France, assignor to International Harvester Company, Chicago, Ill., a corporation of Delaware
Filed July 9, 1968, Ser. No. 743,361
Int. Cl. A01d 55/02, 35/12, 55/28
U.S. Cl. 56—282                                        6 Claims

ABSTRACT OF THE DISCLOSURE

A mower having a coupler bar, a pair of pivotally interconnected elements one connected to the coupler bar, a mower connected to the other element, and the axis of pivot of the elements being substantially horizontal and proximate to the leading edge of the cutter bar, and a linkage interconnecting the elements to adjust the position of the cutter bar about said axis.

Cross-references to related applications

This is a companion application of Jacques E. Bouet's United States patent application Ser. Number 621,006 filed on Mar. 6, 1967.

Background of the Invention

This invention relates to mowers of the type in which the outer end of the cutter bar has an outer shoe and the inner end is rigidly fixed to an inner shoe. The inner shoe is pivotally mounted or hinged for vertical swinging about a generally horizontal axis, and the pivotal connector or hinge being pivoted to a hitch about an axis which is located at a generally right angle to the horizontal axis. The hitch in turn is pivoted to the tractor frame about a horizontal axis which is parallel to the direction of forward travel of the mower.

In known mowers of this type, the above-mentioned hinge is directly pivoted to the hitch or coupler bar about an axis which is upwardly and outwardly inclined with respect to the cutter bar. And the cutter-bar tilt, that is to say the angle of inclination of the cutter bar and of the inner shoe to which said cutter bar is secured, is controlled by means of a hand-lever which is designed to modify the angular position of the hinge on the hitch means or coupling bar.

Summary

The disadvantages of the prior art arrangement referred to above is in the geometry of the complete assembly. Any change in the tilt adjustment for changing the cutting angle or height results in a modification of the relative position of the outer shoe at the free end of the cutter bar with respect to the inner shoe in the direction of forward travel of the mower. Thus, when the tilt or cutting angle is increased or decreased, the outer shoe is moved forwardly or rearwardly, i.e. in leading or trailing relation to the inner shoe, angularly offsetting the mower bar from advancing at a right angle into the crop to be cut.

The aim of this invention is to provide a mower assembly of the type referred to which is not attended by the above drawback.

To this end, in accordance with the invention, the axis about which the above mentioned hinge is pivoted to the coupler bar is parallel to the cutter bar.

By virtue of this particular arrangement, when the angular position of the hinge on the hitch is modified by means of the hand lever, the cutter bar tilt is modified as desired without disturbing the relative positions of the outer and inner shoes in the direction of forward travel of the mower.

As a preferable feature, the axis about which the hinge is pivoted to the hitch is located in the vicinity of the leading edge of the cutter bar, with the result that any modifications in the cutting angle or tilt have practically no influence on the ground clearance of the cutter bar.

In accordance with another feature of the invention, the hinge is mounted on the hitch by means of an intermediate member which is in turn capable of taking up on the angular position which is variable with respect to an oblique axis which is upwardly and outwardly inclined to the cutter bar. By virtue of this particular expedient, the different supporting members of the cutter bar can be adjusted for wear, especially at the points of pivotal attachment, and the outer shoe can be brought back on a straight line which is located at right angles to the direction of forward travel of the mower and which passes through the inner shoe. At the same time, the cutting angle or tilt which tended to become reduced as a result of wear is accordingly restored.

In accordance with yet another feature of the invention, advantage is taken of the fact that the intermediate hinge-support member is capable of pivoting on the hitch about the aforesaid oblique axis in order to provide a connection between said intermediate member and the hitch by means of a safety member which is capable of maintaining the assembly in the working position but which is designed to yield under any excessive stress to which said cutter bar may accidentally be subjected, said safety member being, for example, a shear bolt or alternatively a calibrated spring.

Brief description of the drawing

A better understanding of the invention will be gained by perusal of the following description and by consideration of the accompanying drawings which show by way of non-limitative example one form of execution of an improved system in accordance with the invention for the tilt control of a mower.

In these drawings:

FIGURE 4 shows in perspective one form of execution of the device which is shown diagrammatically in FIGURES 1 to 3;

FIGURE 5 is an enlarged sectional view taken along line V—V of FIGURE 4 showing the detail design of the safety device which is incorporated in the mechanism of FIGURE 4, and FIGURES 6 and 7 are views which are similar to FIGURE 4 showing the maximum and minimum tilt positions.

Descripition of the preferred embodiments

Figure 1:
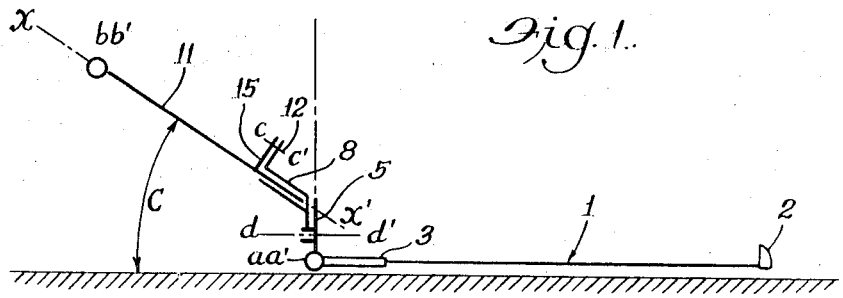
FIGURE 1 is a diagrammatic view looking on the rear of the complete mower mechanism.
Figure 2:
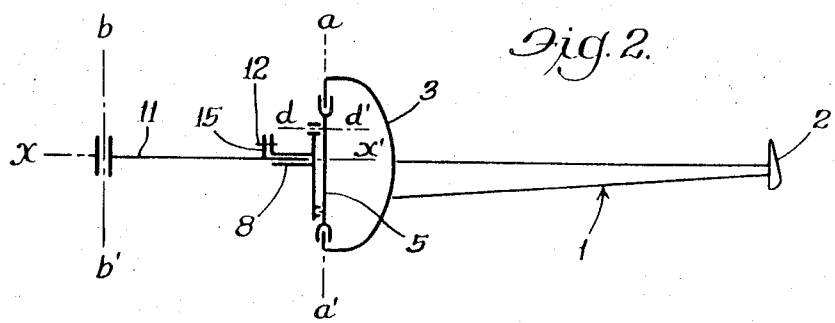
FIGURE 2 is a corresponding plan view.
Figure 3:
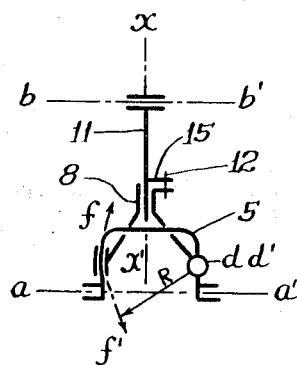
FIGURE 3 is an end view corresponding to FIGURE 1.

The mower mechanism which is shown in diagrammatic form in FIGURES 1 to 3 and in structural detail in FIGURE 4 comprises a cutter bar generally designated as 1. The free or outer end of the cutter bar is fitted with an outer shoe 2 whilst the other or inner end is rigidly fixed to an inner shoe 3 which is pivotally mounted on a pivotal connector member or hinge 5 about an approximately horizontal axis $a$–$a'$ located transversely with respect to the cutter bar 1 and extending in the direction of travel of the mower. The hinge 5 is capable of pivoting about a pin 6, shown in FIGURES 4, 6 and 7, located on the exis $d$–$d'$, FIGURES 1 and 2 having a horizontal direction extending in the lengthwise direction of the cutter bar 1 on a support frame or intermediate member 8.

The intermediate member 8 is carried by the coupler or hitch bar 11 which is capable of pivoting on the tractor frame (not shown) about an axis b–b' having a horizontal direction which extends in the direction of travel of the mower.

The intermediate member 8 can be displaced angularly on the hitch 11 about an axis having a direction x–x' which is upwardly and outwardly inclined at an angle C (FIGURE 1) with respect to the cutter bar 1. The intermediate member 8 is stationarily fixed on the coupler bar 11 by means of the bolt 12 which is shown by way of example in FIGURES 1 and 5. The bolt is a shear bolt which is inserted through a hole formed in a lug 13 integral with the intermediate member 8 and through one of a series of holes such as the hole 14 which are formed in a lug 15 which is integral with the coupler bar 11. The holes formed in the lugs 13 and 15 through which the shear bolt 12 is inserted are lined respectively with bushings 18, 19 of hardened steel.

The angular position of the hinge 5 on the intermediate member 8 defines the tilt of the cutter bar 1. This position can readily be adjusted by means of a tilt-adjustment lever 21 which is pivotally mounted on a pin 22 carried by the intermediate member 8 and coupled to the hinge 5 by means of a link arm 23. There are shown at 27 and 28 respectively the pins about which the two ends of the link arm 23 are pivoted to the lever 21 and to the hinge 5.

The lever 21 carries a catch pawl 31 which is intended to engage in the notches of a sector 32 which is coaxial with the fulcrum pin 22 of said lever and rigidly fixed to the intermediate member 8. In addition, the hinge 5 can be securely locked on the intermediate member 8 by means of a screw 34 which is mounted in said intermediate member and passes through a slot 35 of the hinge 5 which has the shape of a circular arc, the center of which is located on the axis d–d'. It is obviously necessary to slacken off this screw 34 when it is desired to modify the tilt of the cutter bar 1 by operating the hand lever 21 in the desired direction, that is to say either in the forward direction in order to increase the cutting angle as shown in particular in FIGURE 6 in which the cutting angle is of maximum value, in which case the axis a–a' of the hinge makes an angle A below the horizontal line h, or in the rearward direction as shown in FIGURE 7 in which the cutting angle is of minimum value, in which case the axis a–a' of the hinge makes an angle B above the horizontal line h which can if necessary be equal to the angle A.

It is of interest to note that the horizontal axis d–d' of pivotal motion of the hinge is located close to the hinge axis a–a' and is therefore also located very near the leading edge of the cutter bar 1.

By virtue of the particular arrangement which has just been described, when the tilt of the cutter bar 1 is modified by operating the lever 21, the outer shoe 2 moves either forwards or backwards to the same extent as the inner shoe 3, which is one of the aims which the invention seeks to achieve. This is due to the fact that the axis d–d' about which the hinge 5 pivots on the intermediate member 8 is parallel to the general direction of the cutter bar 1.

Moreover, by virtue of the fact that said axis d–d' is located very near the leading edge of the cutter bar 1, any modifications in the cutting angle or tilt have practically no influence on the position of the cutter bar above ground level.

Furthermore, the effects of wear of the mechanism have a tendency to reduce the cutting angle to a slight extent and also to cause the outer shoe 2 to move back with respect to the inner shoe 3, with the result that the cutter bar is no longer perpendicular to its direction of forward travel. Under these conditions, when a certain degree of wear has developed, the intermediate member 8 is rotated on the hitch 11 in the direction of the arrow f (FIGURE 4) by changing the hole 14 in which the bolt 12 is engaged, with the result that the intermediate member 8 takes up the position shown at 8' in chain dotted lines and the axis a–a' of the hinge accordingly takes up the position a1–a'1 which is slightly declined in the forward direction with respect to its preceding position, thereby compensating for insufficient tilt which results from wear. In addition, the outer end of the cutter bar 1 moves forward, with the result that the outer shoe 2 takes up position 2', whereupon the cutter bar is again located at right angles to its direction of forward motion. This result is brought about by the upward and outward inclination with respect to the cutter bar of the axis x–x' of pivotal motion of the intermediate member 8 on the coupling bar or hitch means 11.

Finally, any undue stress to which the cutter bar 1 may accidentally be subjected results in failure of the shear bolt 12 without causing any damage to the mower mechanism.

The shear bolt could in any case be replaced by any other system which is capable of yielding above a predetermined stress such as, for example, a calibrated spring system.

As will be readily understood, the invention is not limited to the form of construction which has been described and illustrated and which has been given solely by way of example. A number of modifications could accordingly be introduced without thereby departing either from the scope or the spirit of this invention.

The embodiments of the invention for which an exclusive property or privilege is claimed are defined as follows:

1. A mower assembly comprising a coupling bar, a mower including a cutter bar having a leading edge, means connecting said cutter bar to the coupling bar and including a pair of pivotally interconnected elements having a generally horizontal axis of pivot disposed proximate to the leading edge of the cutter bar and extending lengthwise of the cutter bar about which said cutter bar is adapted to be tilted, and means interconnecting said elements and adapted to tilt said cutter bar in selected adjusted positions about said axis relative to said coupling bar.

2. The invention according to claim 1 and torque limiting locking means including a yieldable element fastening the coupling bar to one of said elements and adapted to be shearable upon the imposition of excessive torque thereto.

3. The invention according to claim 1 wherein said connecting means includes an adjustable linkage interconnecting said elements to permit adjustment of the cutter bar relative to said coupling bar about said axis.

4. The invention according to claim 3 wherein said adjustable linkage includes a sector having dentails and mounted on one of said elements, a handle pivoted on said one element and being disposed in cooperating relationship to said sector, said handle having a pawl engaging said dentils, linkage means articulately connecting said handle to the other of said elements and being operative to effect said pivotal movement of said other element relative to said one element through selective movement of said handle and locking the elements in fixed adjusted positions via engagement of the pawl with the dentils.

5. The invention according to claim 4 wherein said connecting linkage includes lost-motion means.

6. The invention according to claim 4 wherein said connecting linkage includes locking means adapted to lock said other element thereto.

References Cited

UNITED STATES PATENTS 301,796   7/1884   Bordwell _____ 56—281

(Other references on following page)

| | | | | |
|---|---|---|---|---|
| 760,707 | 5/1904 | Sharp | 56—287 |
| 1,321,058 | 11/1919 | Koch | 56—272 |
| 1,855,838 | 4/1932 | Kranick | 56—25 |
| 1,947,552 | 2/1934 | Huddle | 56—25 |
| 2,002,275 | 5/1935 | Pearson | 56—25 |
| 2,743,568 | 5/1956 | Elfes | 56—25 |
| 2,817,204 | 12/1957 | Heinlein et al. | 56—25 |

RUSSELL R. KINSEY, Primary Examiner

U.S. Cl. X.R.

56—25